US009319220B2

(12) United States Patent
Grewal et al.

(10) Patent No.: US 9,319,220 B2
(45) Date of Patent: Apr. 19, 2016

(54) METHOD AND APPARATUS FOR SECURE NETWORK ENCLAVES

(75) Inventors: Karanvir Grewal, Hillsboro, OR (US); Men Long, Hillsboro, OR (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1780 days.

(21) Appl. No.: 12/032,618

(22) Filed: Feb. 15, 2008

(65) Prior Publication Data
US 2009/0210699 A1 Aug. 20, 2009

(51) Int. Cl.
H04L 29/06 (2006.01)
H04L 9/08 (2006.01)
H04L 9/32 (2006.01)

(52) U.S. Cl.
CPC ............... *H04L 9/083* (2013.01); *H04L 9/321* (2013.01); *H04L 9/3247* (2013.01)

(58) Field of Classification Search
USPC ................................................ 713/155, 168
See application file for complete search history.

(56) References Cited

U.S. PATENT DOCUMENTS

2004/0098609 A1* 5/2004 Bracewell et al. ............ 713/200
2005/0025091 A1* 2/2005 Patel et al. .................... 370/328
2005/0154873 A1* 7/2005 Cam-Winget et al. ........ 713/150
2007/0220598 A1* 9/2007 Salowey et al. ................. 726/10
2007/0288997 A1* 12/2007 Meier et al. ........................ 726/4
2008/0065884 A1* 3/2008 Emeott et al. ................. 713/168
2008/0115199 A1* 5/2008 Young et al. ....................... 726/6

OTHER PUBLICATIONS

McGrew, David, and John Viega. "The Galois/Counter mode of operation (GCM)." (2005).*
Droms, Ralph, and William Arbaugh. Authentication for DHCP messages. RFC 3118, Jun. 2001.*

* cited by examiner

*Primary Examiner* — Vikkram Bali
*Assistant Examiner* — Tracy Mangialaschi
(74) *Attorney, Agent, or Firm* — Barnes & Thornburg LLP

(57) ABSTRACT

Methods and apparatus are disclosed to provide for security within a network enclave. In one embodiment authentication logic initiates authentication with a central network authority. Packet processing logic receives a key and an identifier from the central network authority. Security protocol logic then establishes a client-server security association through a communication that includes a client identifier and an encrypted portion and/or an authorization signature, wherein a client authorization key allocated by the central network authority can be reproduced by a server, other than said central network authority, from the client identifier and a derivation key provided to the server by the central network authority to decrypt the encrypted portion and/or to validate the communication using the authorization signature. The server may also provide the client with new session keys and/or new client session identifiers using server-generated derivation keys if desired, protecting these with the client authorization key.

12 Claims, 3 Drawing Sheets

METHOD AND APPARATUS FOR SECURE NETWORK ENCLAVES

CROSS-REFERENCE TO RELATED APPLICATIONS

This disclosure is related to U.S. patent application Ser. No. 11/731,562, filed Mar. 30, 2007; and to U.S. patent application Ser. No. 11/935,783, filed Nov. 6, 2007.

FIELD OF THE DISCLOSURE

This disclosure relates generally to the field of networking. In particular, the disclosure relates to protecting confidentiality and integrity of network communications through secure encrypted transfers within a network enclave.

BACKGROUND OF THE DISCLOSURE

High performance networks (gigabit and beyond) to support new usage models and services such as voice, video and data, present new challenges in the area of security. The need to protect data in transit for confidentiality and integrity is important, but supporting high speed cryptographic operations for all secured connections terminating at a server is expensive on high performance links. The storage required to maintain all of the security associations and cryptographic keys adds to the expense.

Secure connection setup overhead degrades user experience and creates Denial-of-Service (DoS) opportunities, especially where computationally expensive asymmetric cryptographic operations are employed (e.g. RSA or Diffie-Hellman).

Within an enterprise, end-to-end security prevents IT (Information Technology) monitoring devices and IDS/IPS (Intrusion Detection Systems/Intrusion Prevention Systems) from performing their respective functions, as the encrypted data is inaccessible to the monitoring devices.

Security protocols such as IPsec (Internet Protocol Security) and TLS (Transport Layer Security) provide authentication and privacy of communications over the network. Yet, at least partly due to the challenges presented above, support for and use of such security protocols has been less than pervasive. Thus the security solutions that will address these challenges, especially in future high performance networks, have not been fully explored.

BRIEF DESCRIPTION OF THE DRAWINGS

The present invention is illustrated by way of example and not limitation in the figures of the accompanying drawings.

DETAILED DESCRIPTION

Figure 1:
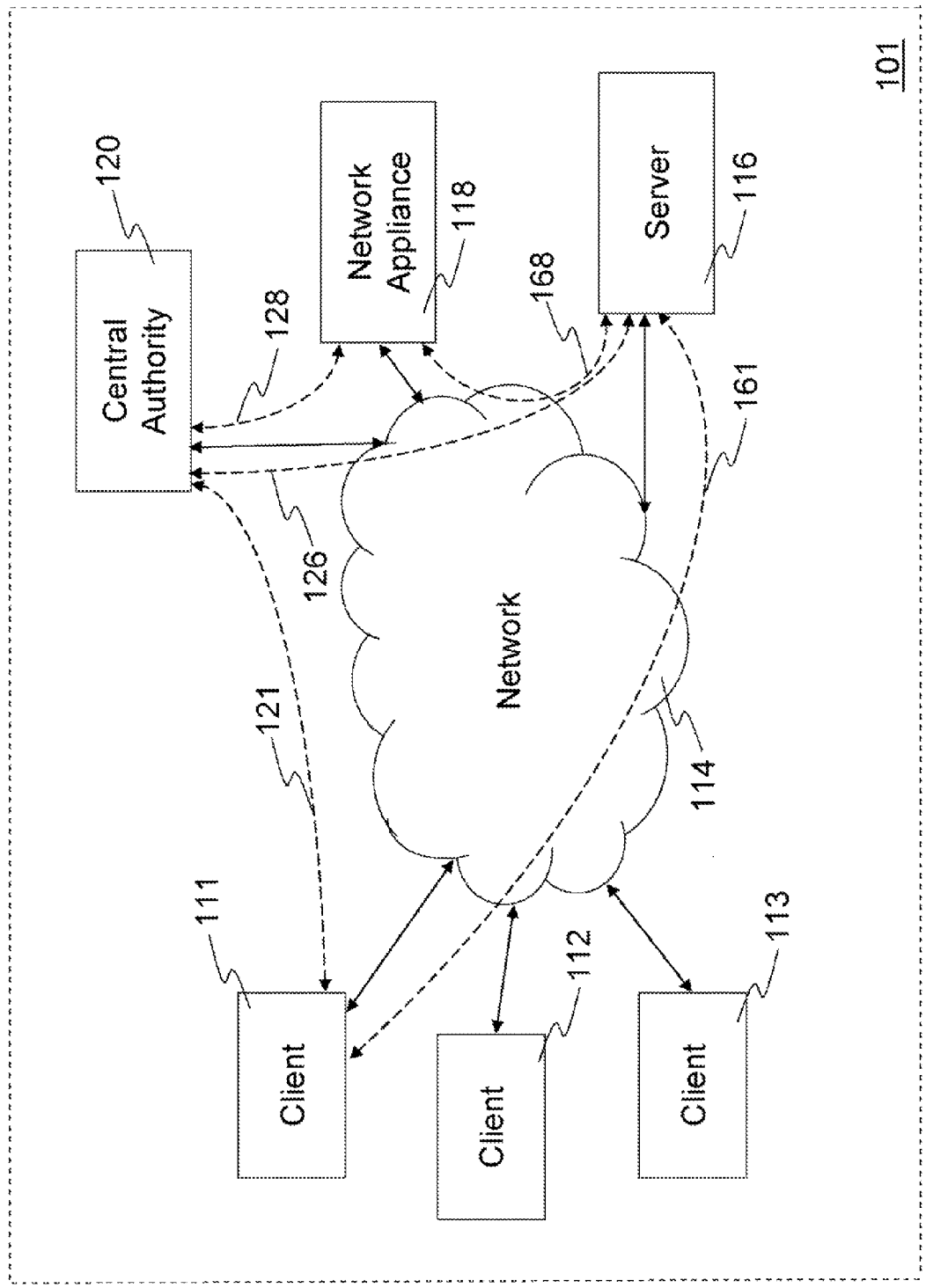
FIG. 1 illustrates one embodiment of a network enclave for protecting confidentiality and integrity of network communications through secure transfers within the enclave.

Methods and apparatus to provide for security within a network enclave are disclosed below. In one embodiment authentication logic initiates authentication with a central network authority. Packet processing logic receives a token including a key and an identifier and may include some additional information from the central network authority. Security protocol logic then establishes a client-server security association through a communication that includes a client identifier and an encrypted portion and/or an authorization signature, wherein a client authorization key allocated by the central network authority can be reproduced by a server, other than the central network authority, using the client identifier and a derivation key provided to the server by the central network authority to decrypt the encrypted portion and/or to validate the communication using the authorization signature.

The server may also provide the client with a new session key and a new client session identifier if desired, protecting these with the client authorization key. In such a way, the client-server security association can be established/maintained, and new session keys can be distributed using a lightweight protocol and without requiring further intervention from the central network authority.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

For the purpose of the following discussion, a derivation key refers to a master key used to derive a set of unique client or session keys used for data authenticity/confidentiality within a network enclave or domain of use. A client or session identifier refers to a unique identifier within a network enclave or domain of use to identify a particular session and/or client and the identifier may be conveyed with transmitted packets to identify the relevant security association. A client or session key refers to a symmetric cryptographic key that is unique per session and is used for data authenticity/confidentiality within that session. Given a pseudo random function, psf (e.g. a one-way hash function such as HMAC-SHA-1 or some cryptographic algorithm such as an AES round) the derivation key, client/session identifier and a client/session key (and perhaps some other optional inputs such as a nonce value) are all related as follows:

Client/session key=*prf*(Derivation key,Client/session identifier,[other]).

It will be appreciated that in standard protocols such as IPsec, a resynchronization (or a rekeying) involves partial authentication between peers. According to embodiments of security associations within a network enclave, mutual authentication (e.g as performed in Phase 1 of IPsec) between peers is not required on a per session basis. In such an environment the peers would either need to negotiate a new session key or request a new session key from a central network authority such as a key distribution center. In the following disclosure, new session keys may be distributed using a lightweight protocol and without requiring further intervention from the central network authority, thus removing a potential bottleneck. It will also be appreciated that disclosed methods and apparatus may be used in accordance with but are not limited to standard protocols such as IPsec or TLS.

FIG. 1 illustrates one embodiment of a network enclave 101 for protecting confidentiality and integrity of network communications through secure transfers within the network enclave 101. Network enclave 101 includes central network authority 120, and may include an authorized network appliance 118, authorized clients (e.g. clients 111-113) and authorized servers (e.g. server 116).

Authentication with central network authority 120 is initiated by client 111 via initiation-response communication 121. In some embodiments, such a central authority 120 may be an AAA (Authentication Authorization and Auditing) server, a key distribution server, a policy server or in some network access control framework such as 802.1X Cisco network Access Control (NAC) or Microsoft Network Access Protocol (MS NAP) or some other Trusted Network Connect (TNC) protocol. In alternative embodiments such a central authority 120 may be some authorizing entity on the Internet (e.g. Paypal) for facilitating authorized transactions for clients. Upon successful authentication, an authorization key and a unique client identifier for the domain being accessed by the client, network enclave 101, are received via the initiation-response communication 121 from central network authority 120. It will be appreciated that embodiments of initiation-response communication 121 may also include additional information such as lifetimes, access rights and/or other attributes.

Authentication with central network authority 120 is initiated by server 116 via initiation-response communication 126. Upon successful authentication, a derivation key for network enclave 101 is received via the initiation-response communication 126 from central network authority 120. It will be appreciated that embodiments of initiation-response communication 126 may also include additional information such as a partial identifier for the key, multiple derivation keys, protocol information and/or other attributes. The derivation key for network enclave 101 may similarly be provided to network appliance 118 for example by central network authority 120 via an initiation-response communication 128 or by the server 116 via communication 168.

A client-server security association is initiated by client 111 via initiation-response communication 161, which includes a client identifier and an encrypted portion and/or an authorization signature. The client identifier and the derivation key provided by the central network authority 120 to server 116 are used by server 116 to reproduce the client authorization key to decrypt the encrypted portion and/or to validate the initiation communication 161 using the authorization signature. When the initiation communication 161 has been validated as coming from an authorized entity, the client-server security association may be established by server 116 transmitting a response communication 161, which may also provide client 111 with a new session key and a new session identifier if desired, these being protected by encrypting them using the client 111's authorization key.

It will be appreciated that since a derivation key (and/or subsequent session derivation keys) may be provided to network appliance 118, network appliance 118 may decrypt packets at wire speed, for example to perform monitoring, IDS or IPS functions, etc.

Figure 2:
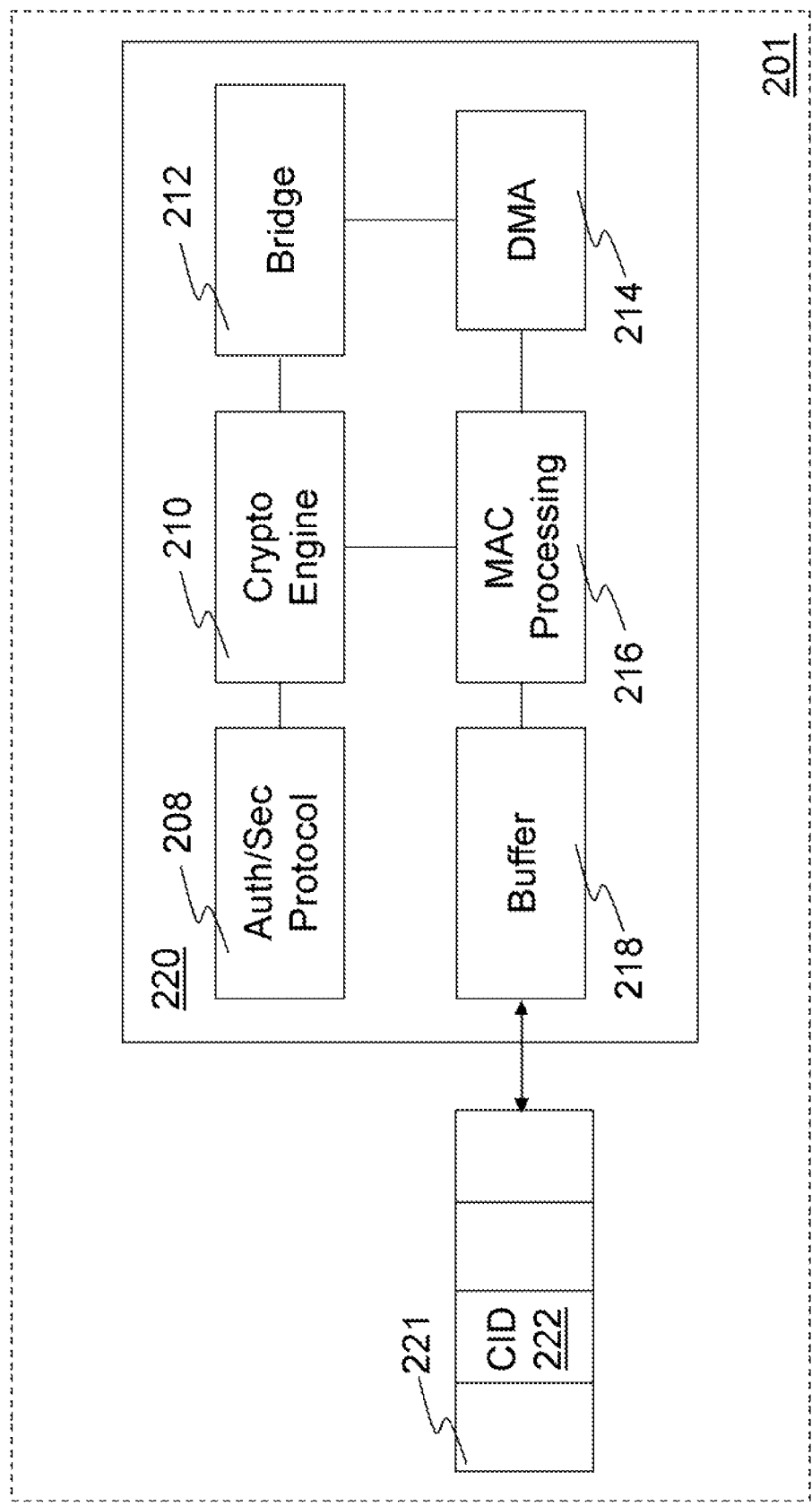
FIG. 2 illustrates one embodiment of a network device to support confidentiality and integrity of network communications through secure transfers within a network enclave.

FIG. 2 illustrates one embodiment of a network device 220 to support confidentiality and integrity of network communications through secure transfers 201 within a network enclave. Network device 220 includes authentication/security protocol logic 208, cryptographic engine 210, bridge 212, direct memory access (DMA) module 214, MAC processing unit 216 and a buffer 218. Cryptographic engine 210 is coupled to bridge 212. The bridge 212 is coupled to DMA module 214, which in turn is coupled to MAC processing unit 216.

Authentication/security protocol logic 208 includes authentication logic to initiate authentication with a central network authority 120 within a network enclave 101. Embodiments of network device 220 may be part of a network interface card (NIC) or part of an integrated MAC within a processor chip/set, providing for wire speed end-to-end security and seamless deployment of security solutions within a network enclave. MAC processing unit 216 communicates with incoming and outgoing packets 221 through buffer 218 and includes packet processing logic to receive from said central network authority a key and an identifier.

It will be appreciated that in embodiments of the disclosed exchanges standard protocols such as IPsec may be employed using the frame format of IPsec frames to piggyback the client identifier (CID) 222 on the security parameter index (SPI) field of an IPsec header. A sequence number may also be piggybacked in the IPsec header, and the frame otherwise conforming to a standard IPsec frame. It will be appreciated that embodiments of the disclosed exchanges are not limited to conforming to a standard IPsec frame, but could also be wrapped in an alternative protocol/UDP port, etc.

Authentication/security protocol logic 208 also includes security protocol logic to establish a client-server security association using a communication including a client identifier (CID) 222 and an encrypted portion and/or an authorization signature, wherein a client authorization key allocated by the central network authority can be produced by a server, other than said central network authority, from CID 222 and a derivation key provided to the server by the central network authority to decrypt the encrypted portion or to validate the communication using the authorization signature.

It will be appreciated that employing derived client/session keys may reduce the storage required for storing multiple session keys and their security associations. Embodiments of the disclosed light-weight protocol between client and server may reduce security association setup overhead by eliminating mutual authentication between peers, expensive asymmetric key exchanges and potential synchronization bottlenecks associated with access to the central network authority.

Figure 3:
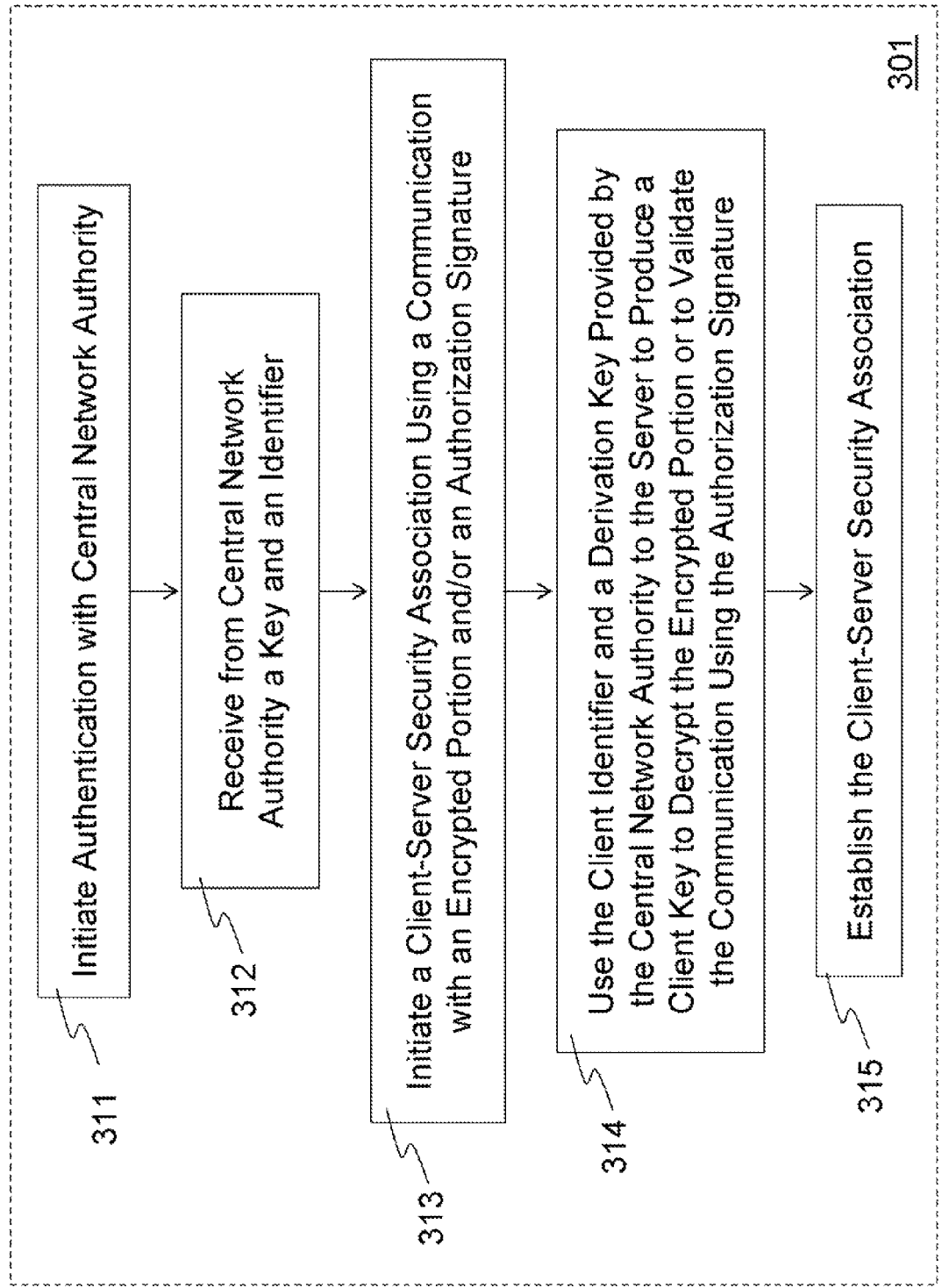
FIG. 3 illustrates a flow diagram for one embodiment of a process to protect confidentiality and integrity of network communications through secure transfers within a network enclave.

FIG. 3 illustrates a flow diagram for one embodiment of a process 301 to protect confidentiality and integrity of network communications through secure transfers within a network enclave. Process 301 and other processes herein disclosed are performed by processing blocks that may comprise dedicated hardware or software or firmware operation codes executable by general purpose machines or by special purpose machines or by a combination of both.

In processing block 311 authentication with a central network authority is initiated. In some embodiments, such a central authority may be an AAA server, a key distribution server, a policy server or in some network access control framework such as 802.1X NAC or MS NAP or network authentication protocol such as Kerberos or some other TNC (trusted network connect) protocol. In alternative embodiments such a central authority may be some authenticating/authorizing entity on the Internet for facilitating authenticated/authorized transactions for clients. Then in processing block 312 a key and an identifier are received from said central network authority. For example, where the key and identifier are received by a client device the key may be a client authorization key and the identifier may be a unique client identifier for the domain being accessed by the client. On the other hand, a server may receive a derivation key used to generate client authorization keys.

In processing block 313 a client-server security association is initiated using a communication including a client identifier and an encrypted portion and/or an authorization signature. In processing block 314 the client identifier and a derivation key provided by the central network authority to the server are used to reproduce the client authorization key to decrypt the encrypted portion or to validate the communication using the authorization signature. The client-server security association is then established in processing block 315. It will be appreciated that in some embodiments the central network authority and the server may be logically different network entities without necessarily residing in physically different machines.

According to embodiments of the disclosed light-weight protocols, new session keys may be distributed without reauthorization and without requiring further intervention from the central network authority, thus removing a potential bottleneck. It will also be appreciated that derivation keys (and/or subsequent session derivation keys) may be provided to network appliances through similar light-weight exchanges. Network appliances may thus be enabled to decrypt packets at wire speed to perform IT monitoring, IDS or IPS functions.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method for secure network communications, the method comprising:
   initiating, by a server, authentication with a central network authority, wherein the server is different from the central network authority;
   receiving, by the server, from the central network authority a first derivation key;
   receiving, by the server from a client, a first communication including (i) a client identifier that is provided by the central network authority and (ii) an encrypted portion and/or an authorization signature;
   generating, by the server, a client authorization key as a pseudo-random function of (i) the client identifier and (ii) the first derivation key;
   performing, by the server, a cryptographic operation using the client authorization key, wherein the cryptographic operation comprises decrypting the encrypted portion using the client authorization key or validating the first communication using the authorization signature and the client authorization key;
   establishing, by the server, a client-server security association with the client using the first communication;
   producing, by the server, a new session key and a new session identifier for the client and encrypting the new session key and the new session identifier using the client authorization key, wherein the new session key and the new session identifier are produced using a second derivation key generated by the server; and
   encrypting, by the server, the second derivation key using the first derivation key to securely transmit the second derivation key to a network appliance.

2. The method of claim 1 wherein the server confirms the client-server security association from the first communication, the server using the first derivation key and the client identifier to reproduce the client authorization key provided to the client by the central network authority to decrypt the encrypted portion or to validate the first communication using the authorization signature.

3. The method of claim 1 further comprising:
   confirming, by the server, the client-server security association from the first communication, the server using the first derivation key and the client identifier to reproduce the client authorization key provided to the client by the central network authority to decrypt the encrypted portion or to validate the first communication using the authorization signature.

4. The method of claim 3 further comprising:
   the server producing a refreshed session key for the client and encrypting the refreshed session key using the client authorization key.

5. A network apparatus comprising:
   authentication hardware logic to initiate authentication by the network apparatus with a central network authority;
   packet processing hardware logic to receive from the central network authority a first derivation key; and
   security protocol hardware logic to:
      establish a client-server security association between a client and a server different than said central network authority using a first communication including (i) a client identifier that is provided by the central network authority and (ii) an encrypted portion and/or an authorization signature,
      generate a client authorization key as a pseudo-random function of (i) the client identifier and (ii) the first derivation key provided to the network apparatus by the central network authority, wherein the client authorization key is separately generated by the central network authority,
      perform a cryptographic operation using the client authorization key, wherein the cryptographic operation comprises to decrypt the encrypted portion using the client authorization key or to validate the first communication using the authorization signature and the client authorization key, and
      securely receive a second derivation key from the server, wherein the server encrypts the second derivation key using the first derivation key to securely transmit the second derivation key to the network apparatus;
   wherein the server produces a new session key and a new session identifier for the client and encrypts the new session key and the new session identifier using the client authorization key, wherein the new session key and the new session identifier are produced using the second derivation key generated by the server.

6. The apparatus of claim 5 wherein the server confirms said client-server security association from the first communication, and the server using the first derivation key and the client identifier to reproduce the client authorization key provided to the client by the central network authority to decrypt the encrypted portion or to validate the first communication using the authorization signature.

7. One or more non-transitory, computer-readable storage media comprising a plurality of instructions that in response to being executed cause a client to:
   initiate authentication with a central network authority;
   receive, from the central network authority, a client authorization key generated by the central network authority and a client identifier;
   initiate a client-server security association using a first communication to a server different than the central network authority, the first communication including (i) the client identifier and (ii) an encrypted portion and/or an authorization signature; and
   receive a second communication from the server in response to the server confirming the client-server security association from the first communication;
   wherein the client authorization key is separately generated by the server as a pseudo-random function of (i) the client identifier and (ii) a first derivation key provided to the server by the central network authority, to decrypt the encrypted portion or to validate the first communication using the authorization signature; and wherein the second communication is to include a new session key and a new session identifier for the client, wherein the new session key and the new session identifier are produced by the server using a second derivation key generated by the server and encrypted using the client authorization key by the server, and wherein the server is to encrypt the second derivation key using the first derivation key to securely transmit the second derivation key to a network appliance.

8. The one or more non-transitory, computer-readable storage media of claim 7 wherein the server is to produce a refreshed session key for the client and encrypt the refreshed session key using the client authorization key.

9. One or more non-transitory, computer-readable storage media comprising a plurality of instructions that in response to being executed cause a server to:

initiate authentication with a central network authority, wherein the server is different from the central network authority;

receive from the central network authority a first derivation key;

receive, from a client, a first communication including (i) a client identifier that is provided by the central network authority and (ii) an encrypted portion and/or an authorization signature;

generate a client authorization key as a pseudo-random function of (i) the client identifier and (ii) the first derivation key;

perform a cryptographic operation using the client authorization key, wherein the cryptographic operation comprises decrypting the encrypted portion using the client authorization key or validating the first communication using the authorization signature and the client authorization key; and establish a client-server security association with the client using the first communication;

produce a new session key and a new session identifier for the client and encrypt the new session key and the new session identifier using the client authorization key, wherein the new session key and the new session identifier are produced using a second derivation key generated by the server; and encrypt the second derivation key using the first derivation key to securely transmit the second derivation key to a network appliance.

10. The one or more non-transitory, computer-readable storage media of claim 9, wherein the server confirms the client-server security association from the first communication, the server using the first derivation key and the client identifier to reproduce the client authorization key provided to the client by the central network authority to decrypt the encrypted portion or to validate the first communication using the authorization signature.

11. The one or more non-transitory, computer-readable storage media of claim 9 further comprising a plurality of instructions that in response to being executed cause the server to:

confirm the client-server security association from the first communication, the server using the first derivation key and the client identifier to reproduce the client authorization key provided to the client by the central network authority to decrypt the encrypted portion or to validate the first communication using the authorization signature.

12. The one or more non-transitory, computer-readable storage media of claim 11 further comprising a plurality of instructions that in response to being executed cause the server to:

produce a refreshed session key for the client and encrypt the refreshed session key using the client authorization key.

* * * * *